Patented June 1, 1937

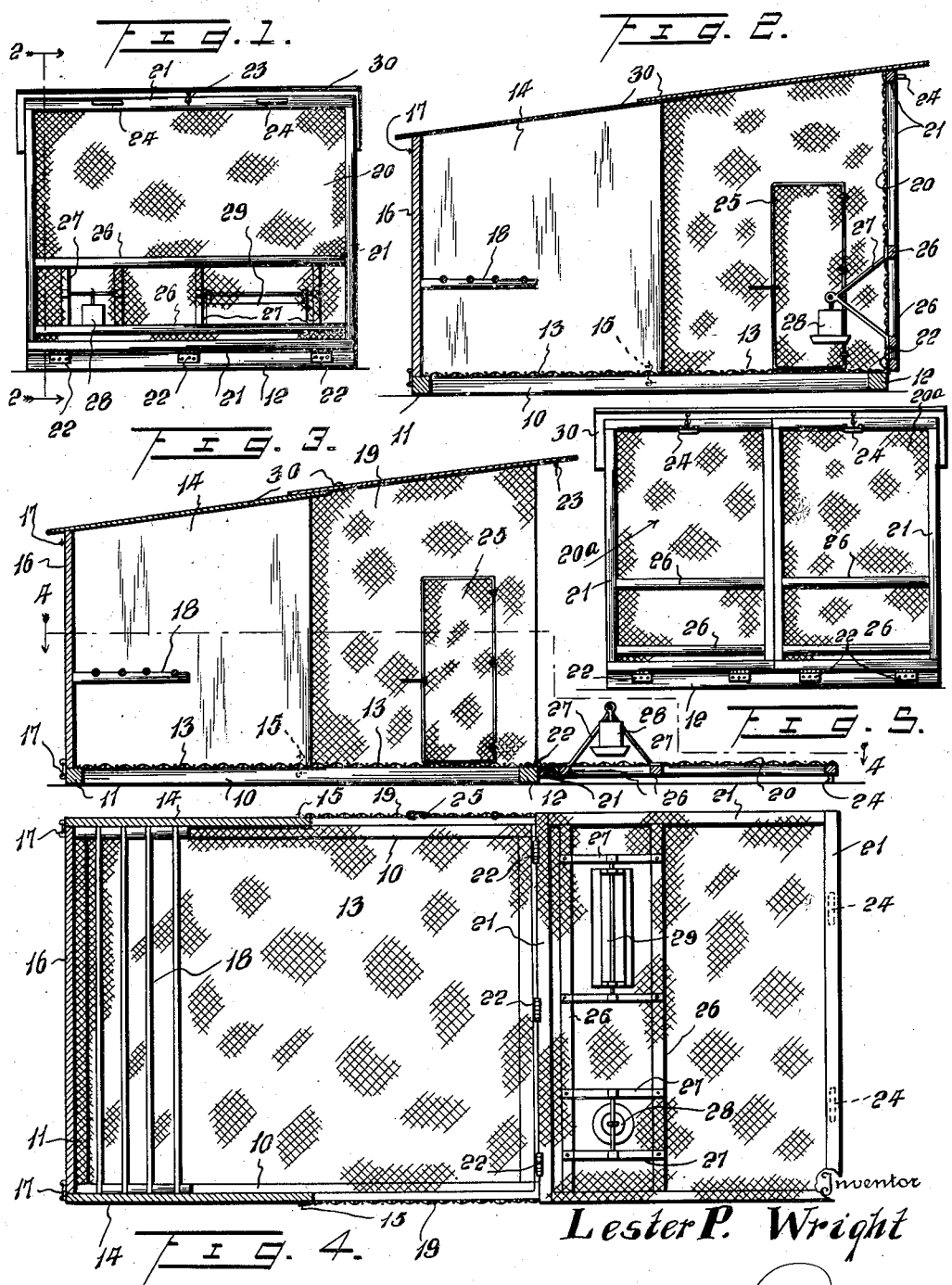
June 1, 1937. L. P. WRIGHT 2,082,132
CHICKEN HOUSE
Filed Jan. 23, 1936

2,082,132

UNITED STATES PATENT OFFICE 2,082,132

CHICKEN HOUSE

Lester P. Wright, Richford, N. Y.

Application January 23, 1936, Serial No. 60,537

2 Claims. (Cl. 119—21)

This invention relates to certain new and useful improvements in chicken houses.

An object of the invention is to provide a chicken house having a wire mesh floor with sections of the vertical walls formed of solid and wire mesh material to permit the free circulation of air therethrough for improving sanitary conditions.

Another object of the invention is to provide a chicken house having a solid wall section and a screen section with a wire mesh floor and a wall of the wire mesh section hinged at its lower horizontal edge and carrying pendulous supported feed and water troughs that automatically assume upright positions when the hinged wall of the wire mesh section is either closed or lowered to a horizontal position to permit free access to the house, the feed and water troughs being supported over either the wire mesh floor of the house or the hinged wall section with the result that the feed and water troughs are held free of contamination.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a front elevational view of a chicken house constructed in accordance with the present invention, showing a hinged wire mesh front wall for the housing with water and feed troughs suspended on the inner side of the front wall;

Figure 2 is a vertical longitudinal sectional view taken on line 2—2 of Figure 1, showing the closed and wire mesh sections of the house, the screened floor and the water trough suspended on the hinged front wall of the wire mesh section;

Figure 3 is a vertical longitudinal sectional view, similar to Figure 2, showing the hinged front wall of the wire mesh section lowered to open position with the water trough pendulously suspended thereover;

Figure 4 is a horizontal sectional view taken on line 4—4 of Figure 3, showing the hinged front wall of the wire mesh section lowered and the water and feed troughs suspended thereover; and Figure 5 is a front elevational view of another form of house wherein the front wall of the wire mesh section is formed of two parts.

The chicken house is of the collapsible type, being formed of sections to facilitate manufacture and shipment and comprises a floor frame, preferably of rectangular form and including side sills 10 and end sills 11 and 12. A wire mesh flooring 13 is suitably anchored at its marginal edges to the sills and provides a floor for the chicken house that is spaced from the ground line and such flooring is of a mesh to permit the passage of droppings therethrough.

The side wall structure of the house comprises boards or other closed panels 14 attached as at 15 to the side sills 10 and the boards or panels are substantially half the length of the side sills, the side wall or panel sections 14 having their rear edges adjacent the rear end sill 11 with the rear end of the housing closed by a panel wall 16 secured in position by the fastening devices 17. A roost 18 projects inwardly of the rear panel wall 16 at a point suitably spaced above the floor 13.

The front section of the housing includes side wire mesh walls 19 that extend rearwardly from the front end sill 12 and with their rear edges overlapping the forward edges of the panel walls 14 of the rear closed end of the housing. A front wire mesh wall 20 is carried by a frame 21, the lower bar of the frame 21 being hinged as at 22 to the front end sill 12 while a catch 23 is carried by the roof 30 for engagement with the upper bar of the frame 21 to retain the same in closed position. Handles 24 are also carried by the upper bar to facilitate opening and closing movement of the hinged front wall and to constitute supports for the upper free swinging edge of the front wall when the same is lowered to an open horizontal position as shown in Figure 3, so that the wire mesh wall 20 will be spaced above the ground line. A hinged door 25 is carried by a side section 19 so that entrance may be had to the chicken house without necessitating the lowering of the front wall 20.

Feed and water troughs are pendulously suspended at the inner side of the front wall 20 and the supports therefor comprise a pair of transversely extending bars 26 arranged in spaced relation and adjacent the lower end of the wall 20 with inverted V-shaped bracket bearings 27 supported at their ends on the bars 26. Feed and water troughs 28 and 29 respectively are pendulously supported on the bracket bearings 27 and constantly assume perpendicular positions irrespective of the angular positions of the front hinged wall 20 as will be evident from an inspection of Figs. 2 and 3 of the drawing. The feed and water troughs are disposed above the wire mesh flooring 13 when the screen wall 20 is in its closed position as shown in Figure 2 and the feed and water troughs are disposed above the wire mesh wall 20 when the latter is lowered to its open position as shown in Figure 3.

An inclined roof 30 is provided for the house, the upper ends of the panel walls 14 and side walls 19 being inclined and said roof that is of the sectional type may be of any material desired, such as corrugated sheet metal, singles or the like.

In the form of invention illustrated in Figure 5, the front end wall of the house comprises two hinged sections 20a which may be selectively opened, or jointly to permit the free run of chickens. A construction of this character will be especially desirable when the chicken house is of larger size or proportion and the opening of the door sections 20a will be facilitated, the construction otherwise remaining the same as illustrated in Figures 1 to 4.

From the above detailed description of the invention, it is believed that the construction and operation thereof will at once be apparent, and while there are herein shown and described the preferred embodiments of the invention, it is nevertheless to be understood that minor changes may be made therein without departing from the spirit and scope of the invention, as claimed.

I claim:—

1. In a chicken house, an elevated wire mesh floor, a rear panel wall section, a front wire mesh wall section including an end wire mesh wall hinged at its lower horizontal edge, and occupying the entire transverse end area of the house whereby the house is entirely open at one end when the end wall is lowered to a horizontal position and feed and water troughs pendulously supported on the hinged end screen wall and spaced inwardly of the inner side thereof.

2. In a chicken house, an elevated wire mesh floor, a rear panel wall section, and a front wire mesh wall section including an end wire mesh wall hinged at its lower horizontal edge, a bar frame supporting the wire mesh of the end wall, spaced bars extending across the bar frame, bearing brackets carried by the spaced bars and feed and water troughs suspended from the bearing brackets and adapted to assume vertically suspended positions over the wire mesh floor when the end wall is closed and to be similarly positioned over the end wall when the latter is opened.

LESTER P. WRIGHT.